No. 773,588. PATENTED NOV. 1, 1904.
C. H. PIERCE.
PNEUMATIC TIRE.
APPLICATION FILED JUNE 3, 1903.
NO MODEL.

WITNESSES:
Harry L. Amer.
Herbert D. Lawson.

INVENTOR
Charles H. Pierce.
By Victor J. Evans
Attorney

No. 773,588.　　　　　　　　　　　　　　　　　　　　　Patented November 1, 1904.

UNITED STATES PATENT OFFICE.

CHARLES H. PIERCE, OF ALMA, CALIFORNIA.

PNEUMATIC TIRE.

SPECIFICATION forming part of Letters Patent No. 773,588, dated November 1, 1904.

Application filed June 3, 1903. Serial No. 159,968. (No model.)

*To all whom it may concern:*

Be it known that I, CHARLES H. PIERCE, a citizen of the United States, residing at Alma, in the county of Santa Clara and State of California, have invented new and useful Improvements in Pneumatic Tires, of which the following is a specification.

My invention relates to new and useful improvements in pneumatic tires; and its object is to provide a protector which is adapted to be placed upon the tread of the tire and prevent the puncturing thereof.

The invention consists in employing a non-resilient hoop having a concaved groove within the inner surface thereof which is adapted to be placed over the tire and receive the tread thereof. Subsequent to this operation the tire is adapted to be filled with air, as ordinarily, and will therefore expand into the groove, and thereby lock the hoop in position.

The invention also consists in the further novel construction and combination of parts hereinafter more fully described and claimed, and illustrated in the accompanying drawings, showing the preferred form of my invention, in which—

Figure 1:
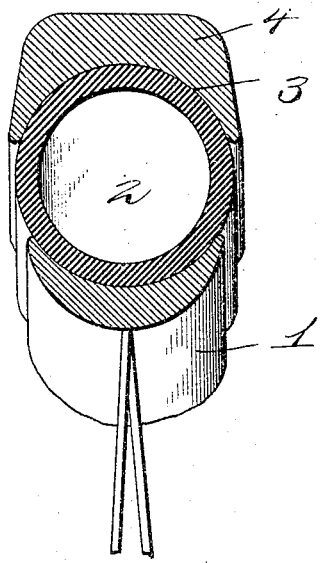
Figure 2:
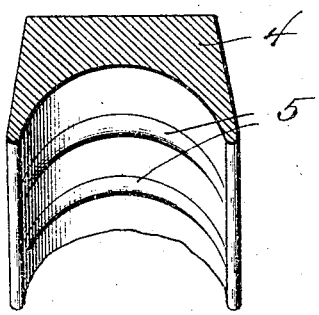

Figure 1 is a section through the tire having my improved guard thereon, and Fig. 2 is a perspective view of a portion of the guard detached.

Referring to the figures by numerals of reference, 1 is the rim of a bicycle-wheel upon which is arranged a pneumatic tire 2. The tread of this tire fits within a concaved groove 3, formed within the inner face of a hoop 4, constructed of any suitable non-resilient material. The internal diameter of the hoop is less than the external diameter of the tire, and it is therefore obvious that when the hoop has been placed upon the tire prior to its inflation the tire can be inflated and will firmly bind the hoop in position thereon. If desired, the surface of the groove may be corrugated, as shown at 5 in Fig. 2. These corrugations will engage the tread of the tire and prevent the hoop from slipping.

The device is very simple and inexpensive in construction and can be attached to an ordinary tire of a bicycle, automobile, or other vehicle. It will be understood that the resiliency of the tire will not be lost by employing this hoop, as the inner edges of said hoop are removed from the edges of the rim 1.

In the foregoing description I have shown the preferred form of my invention; but I do not limit myself thereto, as I am aware that modifications may be made therein without departing from the spirit or sacrificing any of the advantages thereof, and I therefore reserve the right to make such changes as fairly fall within the scope of my invention.

Having thus described the invention, what is claimed as new is—

The combination with the rim of a vehicle-wheel and a pneumatic tire seated therein, of a non-resilient imperforate endless hoop of thick material having an inner groove extending longitudinally of the full length thereof and forming oppositely-reduced embracing side portions, the said grooves being of less depth than one-half the diameter of the pneumatic tire and provided with transversely-extending corrugations at regular intervals throughout the length thereof and terminating at the edges of the reduced side portions of said hoop, the corrugations preventing the pneumatic tire from slipping longitudinally in the hoop.

In testimony whereof I affix my signature in presence of two witnesses.

CHARLES H. PIERCE.

Witnesses:
　CHAS. BERRYMAN,
　R. F. ROBERTSON.